US006804664B1

United States Patent
Hartman et al.

(10) Patent No.: US 6,804,664 B1
(45) Date of Patent: Oct. 12, 2004

(54) ENCODED-DATA DATABASE FOR FAST QUERIES

(75) Inventors: Brian Hartman, Thousand Oaks, CA (US); Michael R. Jones, Jr., Thousand Oaks, CA (US); Laimonas Anusauskas, Westlake Village, CA (US); James Achenbach, Simi Valley, CA (US)

(73) Assignee: NetZero, Inc., Westlake Village, CA (US)

( * ) Notice: Subject to any disclaimer, the term of this patent is extended or adjusted under 35 U.S.C. 154(b) by 417 days.

(21) Appl. No.: 09/685,479

(22) Filed: Oct. 10, 2000

(51) Int. Cl.⁷ ................................................ G06F 17/30
(52) U.S. Cl. ................................ 707/3; 707/2; 707/7
(58) Field of Search ........................ 707/1, 2, 3, 4, 707/5, 6, 7, 8, 9, 10, 100, 101, 102, 200, 201, 202

(56) References Cited

U.S. PATENT DOCUMENTS

| | | | | |
|---|---|---|---|---|
| 5,276,868 A | * | 1/1994 | Poole | 707/200 |
| 5,471,677 A | | 11/1995 | Imanaka | 707/5 |
| 5,560,007 A | * | 9/1996 | Thai | 707/2 |
| 5,649,181 A | | 7/1997 | French | 707/3 |
| 5,740,549 A | | 4/1998 | Reilly | 705/14 |
| 5,794,210 A | | 8/1998 | Goldhaber | 705/14 |
| 5,799,184 A | * | 8/1998 | Fulton et al. | 707/2 |
| 5,819,255 A | | 10/1998 | Celis | 707/2 |
| 5,845,276 A | | 12/1998 | Emerson | 707/2 |
| 5,890,151 A | | 3/1999 | Agrawal | 707/5 |
| 5,913,040 A | | 6/1999 | Rakavy | 709/232 |
| 5,933,811 A | | 8/1999 | Angles | 705/14 |
| 5,946,646 A | | 8/1999 | Schena | 702/127 |
| 5,948,061 A | | 9/1999 | Merriman | 709/219 |
| 5,959,623 A | | 9/1999 | Van Hoff | 345/333 |
| 6,009,432 A | | 12/1999 | Tarin | 707/10 |
| 6,029,176 A | * | 2/2000 | Cannon | 707/104.1 |
| 6,064,999 A | * | 5/2000 | Dalal | 707/102 |

FOREIGN PATENT DOCUMENTS

WO   WO 98/353800   8/1998

* cited by examiner

*Primary Examiner*—Shahid Alam
*Assistant Examiner*—Isaac Woo
(74) *Attorney, Agent, or Firm*—Socal IP Law Group; Steven C Sereboff

(57) ABSTRACT

A new and efficient way of structuring databases enabling efficient query processing, reduced database storage requirements, and more flexible content targeting is described. A database is defined having bit mapped data. The data to be stored in the database is characterized as a number of binary questions. Each record comprises one or more groups of bit maps corresponding to the answers to the questions. For some types of data, there may be two or more possible values. In such cases, each possible value is itself a binary question. In some cases, there may be data which does not lend itself to characterization as binary questions. In such cases, the database includes numeric and string values. Queries of the database may be obtained through simple bit wise Boolean operations directly of the records in the database.

17 Claims, 6 Drawing Sheets

ENCODED-DATA DATABASE FOR FAST QUERIES

RELATED APPLICATION INFORMATION

This application is related to:

application Ser. No. 09/393,391 filed Sep. 10, 1999, entitled "Dynamic Ad Targeting by an Internet Server;"

application Ser. No. 09/419,480 filed Oct. 15, 1999, entitled "Internet Server with Dynamic Ad Targeting Capabilities;" and Application No. filed Aug. 4, 2000, entitled "Dynamic UI for Internet Client."

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to database design, database query technologies and content targeting systems.

2. Description of Related Art

Database management systems (DBMSes) typically store and manipulate data in a manner that closely mirrors the users' view of the data. Users typically think of data as a sequence of records, each logically composed of a fixed number of fields that contain specific content about the entity described by that record. This view is naturally represented by a logical table (or "relation") structure, such as a rectilinear grid, in which the rows represent records and the columns represent fields.

The long-standing existence of record-based tables and their correspondence to a conventional user view, in the absence of generally recognized drawbacks, has led to their nearly universal acceptance as the major underlying internal representation of databases. Yet record-based tables contain key structural weaknesses including high levels of unorderedness and redundancy that have traditionally been regarded as unavoidable. For example, such tables can be sorted or grouped (i.e., the contiguous positioning of identical values) on at most one criterion at a time (based upon column values or some function of either column values or multiple column values). This limitation renders essential database functions, such as querying, on all criteria other than this privileged one awkward and overly resource-intensive.

Database research provides palliatives for these problems, but fails to uncover and address their underlying cause (i.e., the reliance on record-based table structures). For example, the inability to represent a natural, multi-dimensional grouping within the confines of a record-based table structure has led to the creation of index-based data structures. These supplementary structures are inherently and often massively redundant, but they establish groupings and orderings that cannot be directly represented using a conventional table. Index-based structures typically grow to be overly lengthy, convoluted and are cumbersome to maintain, optimize and especially update. Examples of common indexes are b-trees, t-trees, star-indexes, and various bit maps.

The ability to quickly obtain a non-redundant, multi-dimensional data set from a database using flexible sorting criteria is extremely useful to database management.

In advertising, it is considered highly desirable to target advertisements to the appropriate potential customer base, rather than to broadcast advertisements in general. It has long been known that, for example, advertisements for computers should generally not appear in magazines on gardening and, conversely, advertisements for gardening tools should not appear in magazines on computers. Similarly, advertisers have generally targeted their advertisements on television to programs appropriate for the desired customer base.

The development of on-line networks, such as the Internet, has led to on-line advertising. For example, on the Internet, often such on-line advertisements will appear on a web page, such as a banner on the top or the bottom of the page. When the user views a web page using a browser, the banner appears at the appropriate location and the user may then try to find out more information regarding the advertisement by selecting the advertisement (called a "click-through") through the use of the mouse or other pointing device. This will cause a HTTP message to be generated by the browser using the information encapsulated in association with the banner to send a request for an object with a given URL address to a different appropriate web site to access, for example, the advertiser's home page.

Attempts have been made to provide targeting for on-line advertisements. With a small number of users and a small number of ads to be displayed, typical database systems provide acceptable performance. However, as the number of users increases, the number of advertisements increase, and the attributes to be targeted increase, traditional databases perform poorly.

SUMMARY OF THE INVENTION

The present invention provides a new and efficient way of structuring databases enabling efficient query processing, reduced database storage requirements, and more flexible content targeting.

In accordance with one aspect of the present invention, a database is defined having bit mapped data. The data to be stored in the database is characterized as a number of binary questions. That is, there are a number of "yes/no" questions, and each record comprises the answers to these questions. Each record is simply one or more groups of bit responding to the answers to the questions.

According to another aspect of the invention, for some types of data, there may be two or more possible values. In such cases, each possible value is itself a binary question.

In some cases, there may be data which does not lend itself to characterization as binary questions. In such cases, the database includes numeric and string values.

Queries of the database may be obtained through simple bit wise Boolean operations directly on the records in the database.

The database and query techniques described herein are useful in a content targeting system. The database is sufficiently flexible to support rapid targeting of a wide variety of content.

Rather than achieve orderedness through increasing redundancy (i.e., superimposing an ordered data representation on top of the original unordered representation of the same data), the present invention eliminates redundancy on a fundamental level. This reduces storage requirements, in turn enabling more data to be concurrently stored in RAM (enhancing application performance and reducing hardware costs) and speeds up transmission of databases across communication networks, making high-speed main-memory databases practical for a wide spectrum of business and scientific applications. Database operations in general are thus more efficient using the present invention. In addition, certain operations such as histographic analysis, data compression, and multiple orderings, which are computationally intensive in typical structures, are obtainable immediately from the structures described herein. The invention also provides improved processing in parallel computing environments.

DESCRIPTION OF THE DRAWINGS

Further objects of this invention, together with additional features contributing thereto and advantages accruing therefrom, will be apparent from the following description of an embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the embodiments and examples shown should be considered as exemplars, rather than limitations on the apparatus and methods of the present invention.

The System of the Invention

Figure 1:
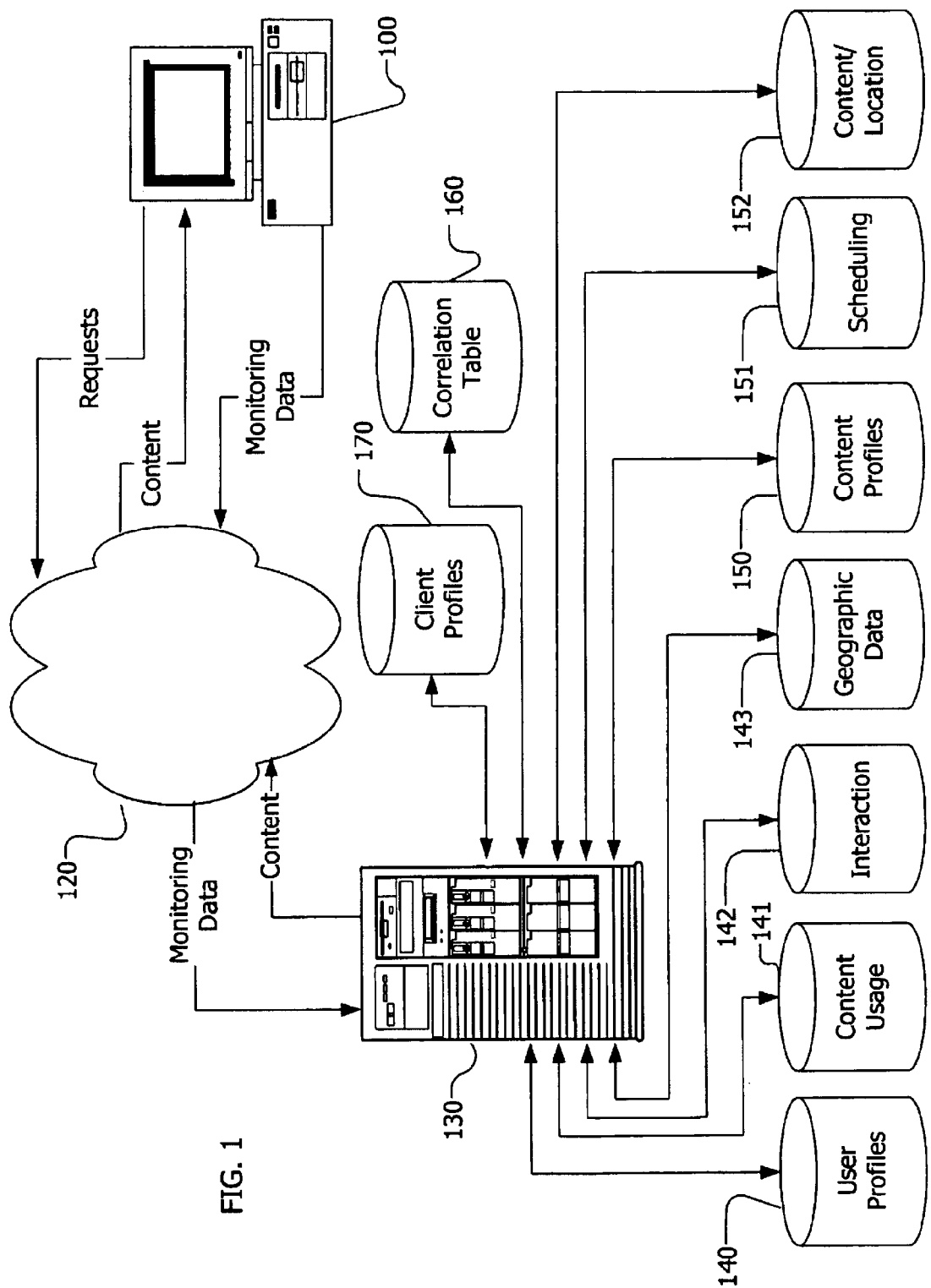
FIG. 1 is a block diagram of a network data distribution system in accordance with the invention.

Referring now to FIG. 1, there is shown a block diagram of a system in accordance with one aspect of the invention. FIG. 1 includes a client device 100, a network 120, a database server 130, plural user databases 140, 141, 142, 143, plural content databases 150, 151, 152, a client database 170 and a correlation table 160. The user databases includes a user profile database 140, a content usage database 141, an interaction database 142, and a geographic data database 143. The content databases include a content profile database 150, a scheduling database 151 and a content/location database 152. A "content" item is any targetable item of content. One example of "content" is a banner ad. However, many other kinds of content are targetable. The user interface for applications such as a browser or banner ad viewer may include targeted content, as may web pages, in whole or in part. The data in the databases may arise from a number of sources.

The client device 100 preferably comprises a client computer that is configured to access the database server 130 via the network 120. The client computer 100 may be, for example, a PC running a Microsoft Windows operating system and a Web browser. The client device 100 may also be, for example, a network appliance, personal digital assistant (PDA), mobile phone, refrigerator, another server, etc. The client device 100 may be used by a person for accessing the Internet. Where the user is a record of an on-line service (e.g., Internet service, BBS, private interactive service), the user typically provides some form of identification as part of a log on process. This identification may be a user ID/password, electronic signature, biometric signature, the user's profile, etc. In some cases, the user's use of the client device 100 creates a presumption of user identity, such as in the case of a mobile phone or PDA. In other cases, a user may have only a passive affiliation with the operator of the database server 130, such as in the case of advertising networks.

The network 120 provides lower layer network support for the client device 100 to interact with other devices on the network, including the database server 130. The network 120 may be, for example, a common or private bi-directional telecommunications network (e.g., a public switched telephone network (PSTN), a cable-based telecommunication network, a LAN, a WAN, a wireless network), coupled with or overlaid by a TCP/IP network (e.g., the Internet or an intranet), or combinations thereof.

The database server 130 is one or more computer programs which as a group provide the indicated services. This software may operate on one computer, or may be operated on a number of more computers or other devices. For example, the database server 130 may include a dedicated ad server that processes advertisement-related data.

The database of the invention is built from records, profiles, targets and attributes. An "attribute" may be of the following types: binary attribute, range attribute or string attribute. As described further below, an attribute's type defines the type of value which that attribute may have. Other attribute types are within the scope of the invention. Attributes are similar to database fields. A "target" consists of one attribute and a value for that attribute. A "profile" is made up of targets, or more particularly, attribute values. A "record" is an entity having the attributes of one or more profiles. A record is one unit of storage in a database, though records may be comprised of profiles in multiple databases.

In the current embodiment of the invention, there are three types of profiles. A "content profile" is a group of targets which in effect define how a given item of content is to be targeted. A "user profile" is a group of targets which in effect define how a given user is to be targeted. A "client profile" is a group of targets which in effect define how a given client is to be targeted. A "query profile" is a group of targets which in effect define a query.

A profile may be represented by a single logical expression comprising targets and logical operators. Content profiles and user profiles have a logical AND between each target. Query profiles are more flexible, and may include logical AND between targets, as well as logical OR. Targets in query profiles may be grouped and nested as desired. Targets and groups of targets in query profiles may have a logical NOT to show that records which match the NOT expression should be excluded. A "match" is a condition where a particular value falls into a target. Thus, if a user profile includes a value that is included in a target, then the profile matches. The attributes in a query target also have added flexibility. Binary attributes in a query profile may have a negative bit set to show exclusion. String attributes may include wildcards.

A "binary attribute" has a predefined list of allowable values. Each binary attribute has associated therewith a corresponding bitmask, the bitmasks each having a length equal to the number of allowable values for the corresponding binary attribute. Each allowable value has one bit assigned to it in a bitmask. Thus, if a given value is applicable for a particular profile, the bit which corresponds to the value in the bitmask is set. The bit should be set with a binary "1". Bits that are not mapped to a specific binary attribute should be automatically set to logical 0. Other manners of setting bits may be used, though this will affect the type of logical operations performed.

Binary attributes are well-suited when there is a limited number of allowable values. The binary attributes in a profile may be concatenated into a single bitmap, which may be divided into "chunks" for easy storage, retrieval and manipulation. Alternatively, the binary attributes may be placed directly into one or more chunks. Current technologies favor chunks having a length of 64 bits. Sometimes, chunks are treated as binary numbers, such as in chunk matching (described below). In other times, chunks are treated as decimal numbers, such as when storing profiles.

As an example of a binary attribute, consider a user profile with a binary attribute of "gender." The predefined list of values would be "male" and "female." Some binary attributes, such as gender, may have only two possible values. By giving each possible value a distinct position in the bitmask, allowance can be made for record profiles which have no value at all for the corresponding attribute. Thus, for example, if the gender is not known, no bits in the bitmask for binary attribute=gender would be set.

Consider the following attributes (questions) and allowable values (answers):

| Question | Answer Number | Answer |
|---|---|---|
| Gender? | A1 | Female |
| Gender? | A2 | Male |
| Household Income? | A3 | $0–19,999 |
| Household Income? | A4 | $20–49,999 |
| Household Income? | A5 | $50–99,999 |
| Household Income? | A6 | $100–199,999 |
| Household Income? | A7 | $200–300,000 |
| Household Income? | A8 | $300,000+ |

The gender attribute therefore requires two bits, and the household income attribute requires 6 bits. These two binary attributes may be mapped to an eight-bit chunk in the following manner:

| Answer Number | Bit Offset |
|---|---|
| A1 | 1 |
| A2 | 2 |
| A3 | 3 |
| A4 | 4 |
| A5 | 5 |
| A6 | 6 |
| A7 | 7 |
| A8 | 8 |

Given the mappings, consider the case of a female user with an income of $350,000. Answer 1 is selected so bit 1 is set to one. Answer 8 is selected so bit 8 is set to 1. All other bits are left as 0. The binary representation is 1000 0001, so the chunk has a decimal value of 129.

A "range attribute" can have a range of numeric values. A record with a range attribute has a single number as its value. A target for this attribute has two numbers: low range and high range. Examples of a range attribute include a user profile attribute of "zip code" or machine configuration profile attribute of "processor speed." Range attributes are useful for numeric attributes that have too many potential values to pragmatically store them as binary attributes.

A "string attribute" can have a free form string value. A record with a string attribute has a string value that represents its value. A target for this attribute has a list of strings. Examples of a string attribute include a user profile attribute of "first name" or a content profile attribute of "city." String attributes are non-numeric attributes that have too many potential values to pragmatically store them as binary attributes.

The correlation table 160 is used in conjunction with binary attributes. The correlation table 160 shows the connection between each answer and the bit that represents it. The correlation table 160 shows how to encode binary attributes, providing static mapping between allowable value and bit location.

The user profile database 140 stores and provides information about users. In some cases, such as with an Internet service provider, the users may provide some user profile information directly. User profile information may be obtained from existing databases or through indirect means (e.g., analysis of user habits, purchasing histories). Users may be required to or may voluntarily update their user profiles on a periodic basis. The user profiles may include demographic information such as age, sex, marital status, home address and hobbies, as well as psychographic information such as likes and dislikes. Information about the client devices used by each user, such as type of device and processing capabilities, may also be obtained and stored in the user profile database 140 or another database.

The content usage database 141 stores and provides information about content usage by users. That is, the content usage information is what the user is receiving and seeking through the network. In the case of an ISP, content usage takes the form of web browsing. Information about a user's web browsing may be captured by the client device 100, analyzed and stored in the content usage database 141. In the case of a television service, this content usage may take the form of TV shows, channels selected at particular times and video rentals. In the case of non-electronic publishing, the content may be newspapers, magazines and books purchased, borrowed or rented.

The interaction database 142 stores and provides information about specific information provided by the users. The interaction database is for storing keywords typed into search engines, information typed into on-line forms, etc. The interaction data differs from the content usage data in that the interaction data does not specify particular content, but rather identifies subject matter considered to be important for some reason to each user.

The geographic data database 143 stores and provides information about a user's location. A user's dial-up information, such as a local access telephone number or the phone number of the client device 100 may be provided to the database server 130 which in turn stores the geographic location of the client device 100 in the geographic data database 143, derived through cross-referencing the known phone number against an appropriate database. Geographic data may also be obtained from the client device 100 through a GPS or other locator system. When using some types of mobile devices, the device's current location may be obtainable.

The content profile database 150 stores and provides content profiles.

The scheduling database 151 stores and provides information about the times when an item of content is to be served. Scheduling may include frequency, maximum number of times to send to a user, minimum number of times to send to a user, first and last days to send, rotation, CPM, impressions to serve, impressions received, click yield and priority.

The content/location database 152 stores and provides items of content (e.g., HTML files) and/or the information about how to serve items of content (e.g., URLs).

The client profile database 170 stores and provides profiles of client devices 100. Client profiles may include such information a software versions, processor type, processor speed, memory size, modem type, etc. The client profile database 170 is related to the user profile database 140, in that the profiles of client devices 100 used by the users are stored in the client profile database 170. User profiles may refer to client profiles, and client profiles may refer to user profiles. This is because a given client may be used by multiple users, and a given user may use multiple client devices.

The Methods of the Invention

Figure 2:
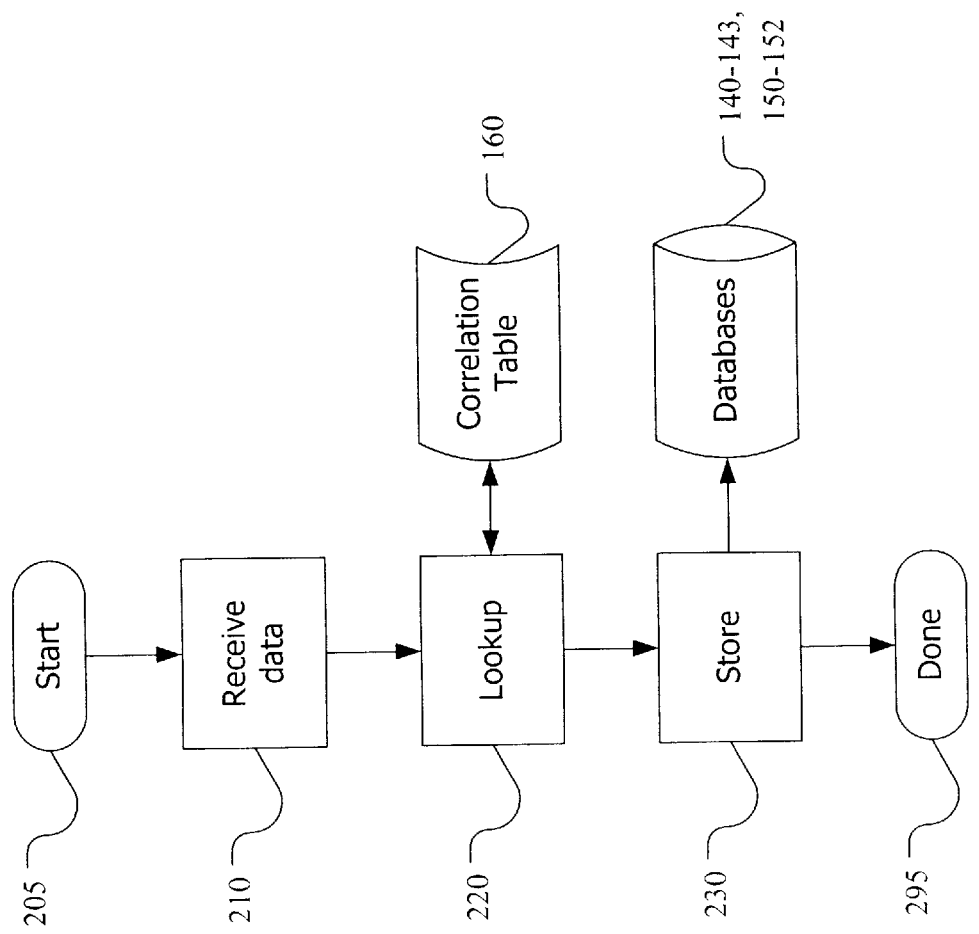
FIG. 2 is a flow chart of the method of storing data in a database in accordance with the present invention.

Referring now to FIG. 2, there is shown a flow chart of the method of storing data in a database in accordance with the present invention. After the method begins (step 205), the database server 130 receives "raw" data for a record (step 210). By "raw," it is meant that the data includes fields which require processing before they are used. The raw data may be received directly, such as through the client device 100, or indirectly.

Alternatively, the database server 130 may receive complete records, or profiles therefore. For example, the client device 100 may pass profiles to the database server 130.

For those fields of the raw data which correspond to binary attributes, the database server 130 looks up the fields in the correlation table 160 and retrieves the bitmask for the binary attributes corresponding to the fields (step 220). For range attributes and string attributes, some processing may also be useful or necessary prior to storing. For example, range values may be rounded, and string values may be concatenated and parsed for illegal characters. The retrieved bitmask, plus the values of the range attributes and string attributes, form one or more profiles of the record.

Next, the database server 130 stores the profiles of the record in the appropriate databases 140–143, 150–152, 170 (step 230). This then completes the process of storing the record in the databases (step 295). Although the process has been described with respect to a single record, records may be processed and stored sequentially or in bulk.

Figure 3:
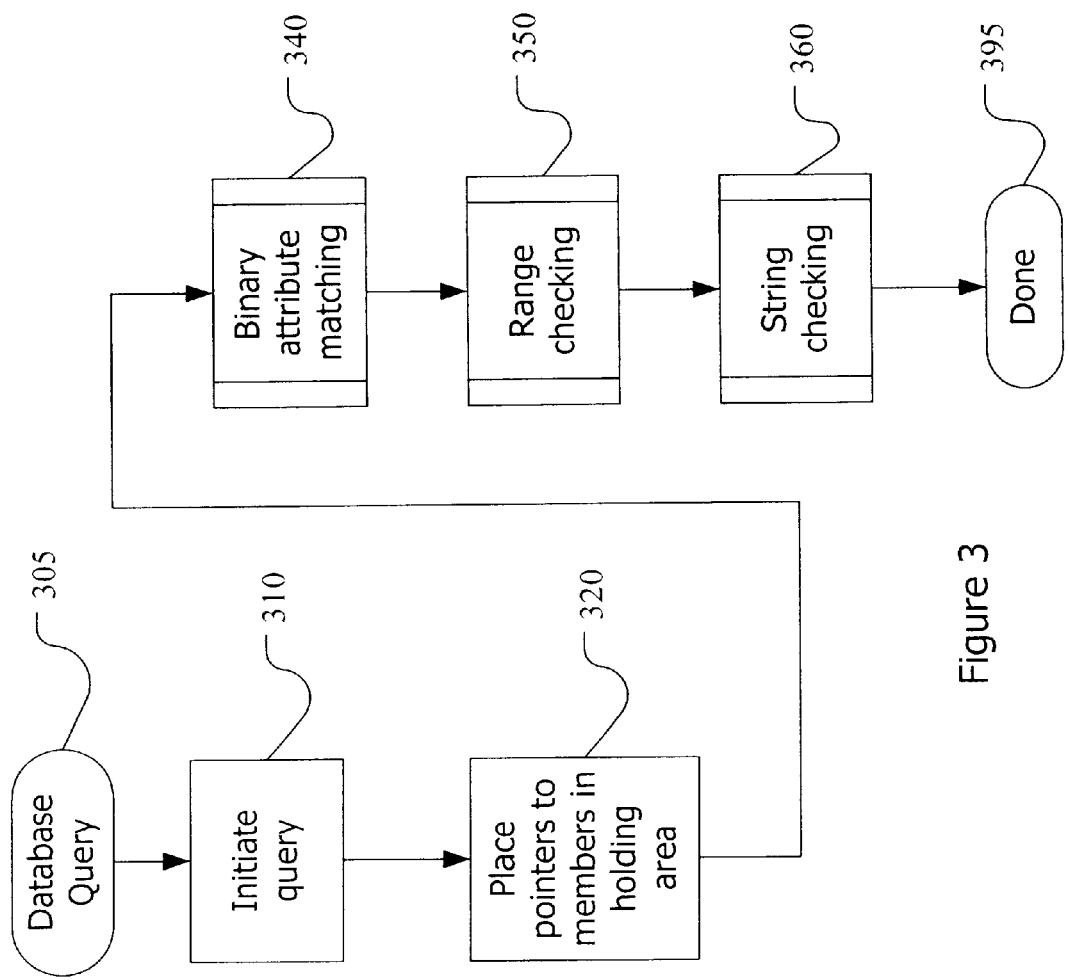
FIG. 3 is a flow chart of a method of querying a database in accordance with the present invention.

Referring now to FIG. 3, there is shown a flow chart of a method of querying a database in accordance with the present invention. The method is first described in general terms, and then details of the method are developed further with respect to FIGS. 4–7. The method of querying the databases is generally implemented as one or more computer programs of the database server 130. Some aspects of the method are or may be operated by other parts of the system of the invention, such as client device 100.

As the method begins (step 305), a query is initiated (step 310). A query is initiated, for example, when the client device 100 requests content, such as a list of targeted advertisements to be displayed. Any of the databases may be queried, and a query may be made to more than one database. For convenience, the database or databases to be queried will be referred to as the "query database." In this step 310, a query profile is prepared. The query profile may include combinations of binary attributes, range attributes and string attributes. The query profile may be a copy of or based upon records of one or more of the databases 140–143, 150–152, 170.

As described below, the method of querying a database is a reductive process. In a typical database query, the fields of each record of the database is compared in turn against the query. If the fields of a record match the query, then the record is added to a list of matching records. A typical database query is therefore an additive process. According to the invention, a query is structured to benefit from how the data is stored (as described above), and how a query may be best processed. The present invention may also be considered a successive filtering process.

According to the invention, the query starts with a holding list of all records in the query database (step 320). Then, those records which do not match the query profile are eliminated from the holding list (steps 340, 350, 360). The holding list defines the query results.

In the preferred embodiment, the holding list has an identifier for each record, rather than copies of the records. This reduces memory requirements and enhances processing efficiency. However, the holding list could have complete, partial or compacted copies of each record, depending on the embodiment. Furthermore, the holding list may be prepared at a point other than directly after the query is initiated. For convenience, the following discussion will not refer to the identifiers in the holding list, but instead will refer to the records as if they were in the holding list. This manner of abbreviation should not be taken in a limiting sense. In some case, such as "run of site" ads in an ad list, records may be added to the holding list after matching, or before matching but excluded from removal.

There is another significant difference between the typical database query and a database query in accordance with the invention. Both consider records in turn. However, in the present invention, when considering a particular record, not all profiles of the record are compared against the query profile in the same cycle. Instead, binary attributes for all records are tested against the binary attributes of the query profile. Those records not matching are eliminated from the holding list. Next, range attributes for all records in the holding list are tested against the range attributes of the query profile. Those records not matching are eliminated from the holding list. Finally, string attributes for all records in the holding list are tested against the string attributes of the query profile. Those records not matching are eliminated from the holding list. It has been found that this method provides faster and faster results the larger the requested list is when compared to an additive process.

In the binary attribute matching step (step 340), the binary attributes of the query profile are matched against the binary attributes in the query database. For example, if the query profile is based upon a user profile from the user profile database 140, then the query profile would be matched against the content profiles in the content profile database 150. Matching may be accomplished through binary operations, such as logical AND.

In the range checking step (step 350), the range attributes of the target profile are matched against the range attributes in the query database. This may be accomplished through numeric and Boolean operations.

In the string checking step (step 360), the string attributes of the target profile are matched against the string attributes in the query database. This may be accomplished through string operations.

With each of the profiles checked, the database query is complete (step 395). Depending on the type of query, however, an additional step may be desirable to further narrow or order the results. This additional step may include the application of business rules for filtering and ordering the records in the holding list.

Figure 4:
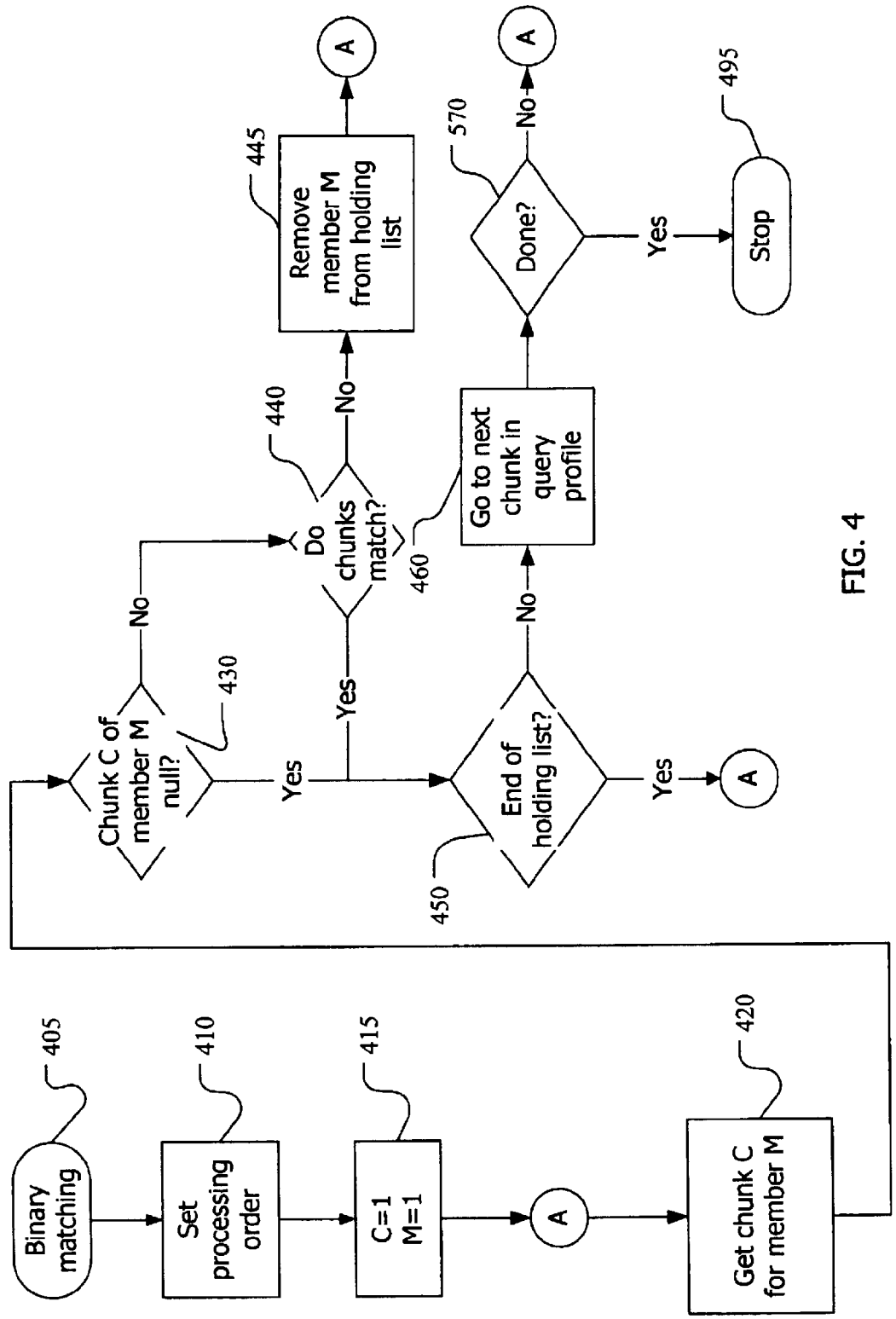
FIG. 4 is a flow chart of an attribute matching step of the method of querying a database.

Referring now to FIG. 4, there is shown a flow chart of one embodiment of the binary attribute matching step (step 320). After entry into this routine (405), the database server 130 establishes an order for processing chunks (step 420). Where there is only one chunk, this step 420 is moot. However, where there are multiple chunks, it is better to determine an order for processing the chunks prior to processing the chunks. With the processing of each chunk, the number of records in the holding list to be processed declines. Thus, binary attribute matching is more efficient if chunks having more non-null values are processed before chunks having less non-null values. The chunks should be processed accordingly.

With the order of processing set, processing can begin. Assuming there are n chunks to be processed, chunks will be processed from 1 to n. Thus, the next step is to set the chunk number C to 1 (step 415). In this step, processing of the holding list is set to the beginning, for example by setting the record number R in the holding list to 1.

Now, the comparison of chunk C of the query profile is made against chunk C of each of the records in the holding list. This is done by first getting the chunk C for record R in the holding list (step 420). Next, chunk C of record R is tested (step 430), and if chunk C of record R is null, then there is no reason to exclude record R from the holding list, so record R should remain in the holding list. On the other hand, if chunk C of record R is not null, it is compared against chunk C of the query profile (step 440). If the chunks match, or if chunk C of record R is null, then it is tested whether record R is the last in the holding list (step 450). This particular form of chunk matching presumes that chunks are logically joined by a logical AND. If record R is not the last in the holding list, then processing should continue with the next record in the holding list (e.g., by incrementing R) (step 420).

A chunk of a record matches the chunk of a query profile when the chunk of the record has all of the bits set in the same position as those in the chunk of the query profile for the purposes of equality. For inequality targeting, then there would be a match only if the chunk of the record did not have the same bit set as the chunk of the query profile. This does not mean that the chunk of the record and the chunk of the query profile are equal numerically. Each bit that is not set (i.e., a logical 0) in the chunk of the query profile indicates the query profile has no preference for this target. For example, if a question is not targeted for a particular ad profile, then all values of the question's answers would be zero. For all intents, a zero in a query profile indicates that the value may be either 1 or 0 in the record profile and still count as a match.

For example, suppose that each chunk has a length of eight bits, a record has a chunk of 102, and the chunk of the query profile is 6. Is there a match between the two values? The answer is yes. Based on the binary representations of each number, 0110 0110 for 102 and 0000 0110 for 6, we can clearly see that for each bit set to one in the chunk of the query profile (#2 & # 3 from the right), the exact same bit is also set to one in the record chunk. All other bits that are set in the record profile are irrelevant. However, instead of having to evaluate each bit separately, the entire chunk can be evaluated at one time by using the query profile's chunk as a bit mask. This is achieved by performing a logical AND (binary operator '&') between the record chunk and the query profile chunk. Then compare the query profile chunk with the result. If the query profile chunk equals the result, then the two chunks are matching. This can be seen using the following logical representation of the example:

|  | Binary | Decimal |
| --- | --- | --- |
| Record | 0110 0110 | 102 |
| Query Profile | & 0000 0110 | 6 |
| Result | 0000 0110 | 6 |

The result of the AND operation and the query profile equivalent so the record matches the query profile.

An example of a non-matching record and query are 100 and 6:

|  | Binary | Decimal |
| --- | --- | --- |
| Record | 0110 0100 | 100 |
| Query Profile | & 0000 0110 | 6 |
| Result | 0000 0100 | 4 |

Since the result is not equal to the query profile chunk, the record does not match the query profile.

If the query profile specifies that the record cannot contain a specific value, then matching is identical except for the final evaluation, where if the query profile chunk equals the result, then the record is removed from the holding list, otherwise it is retained.

Given the fast nature of the comparisons, the larger the chunk, the more questions/answers that can be evaluated at one time. However, given that a processor can only operate on a number of bits at a time, it does not provide any large amount of efficiency to use chunks larger that the processor can operate on at one time. Also, given the ability and need to establish multiple OR conditions for a specific question, breaking the profile into multiple chunks allows accommodation of the OR conditions without having to recreate the entire profile structure for each OR. Instead, only the chunk that contains the questions/answers the OR deals with need be recreated. In the current embodiment, that optimal number is set to 64, since the database server runs on a 64-bit processor running a 64-bit operating system.

Returning to step 440, if the chunks do not match, then record R is removed from the holding list (step 445). Processing then continues with the next record in the holding list (step 420).

Returning to step 450, if the end of the holding list has been reached, then the next chunk of the query profile is set for matching (e.g., C is incremented) (step 460). If there are no more chunks to process (step 470), then processing of binary attributes is complete (step 495). Otherwise, processing continues with the first record in the holding list (e.g., R is set to 1) (step 420).

Figure 5:
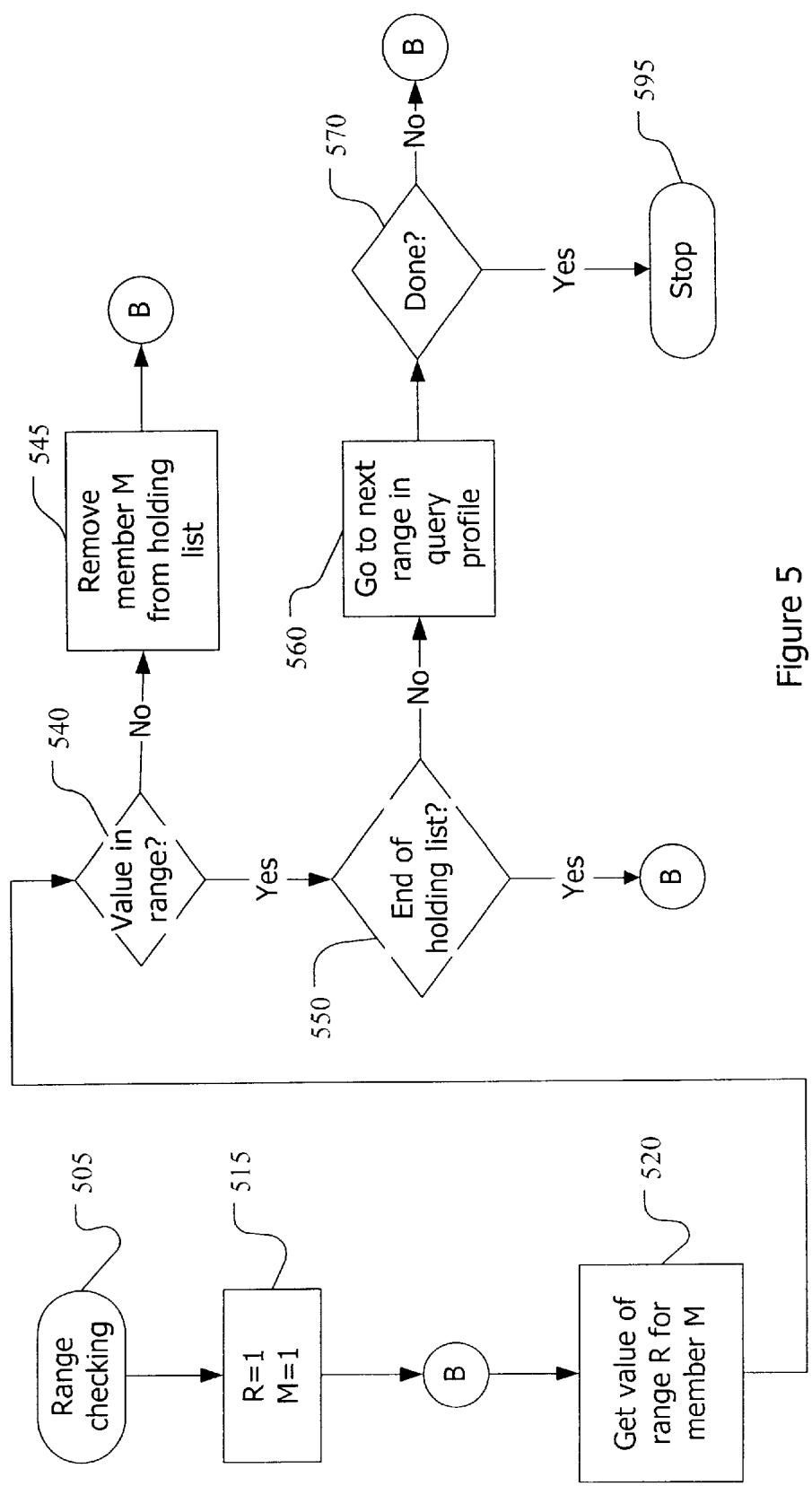
FIG. 5 is a flow chart of a range checking step of the method of querying a database.

Referring now to FIG. 5, there is shown a flow chart of a range checking step (step 350). With entry into this procedure (step 505), cyclical processing in a manner similar to binary matching is performed.

Assuming there are n ranges in the query profile to be processed, the ranges will be processed from 1 to n. Thus, the next step is to set the range number R to 1 (step 515). In this step, processing of the holding list is set to the beginning, for example by setting the record number R to 1.

Now, the comparison of range R of the query profile is made against the value of range R of each of the records in the holding list. This is done by first getting the value of range R for record R in the holding list (step 520). Next, the value of range R of record R is compared against range R of the query profile (step 540). If the value of range R of record R is within range R of the query profile, then it is tested whether record R is the last in the holding list (step 550). If record R is not the last in the holding list, then processing should continue with the next record in the holding list (e.g., by incrementing M) (step 520).

Returning to step 540, if the value of range R of record R is not within range R of the query profile, then record R is removed from the holding list (step 545). Processing then continues with the next record in the holding list (step 520).

Returning to step 550, if the end of the holding list has been reached, then the next range of the query profile is set for testing (e.g., R is incremented) (step 560). If there are no more ranges to process (step 570), then processing of range attributes is complete (step 595). Otherwise, processing continues with the first record in the holding list (e.g., R is set to 1) (step 520).

Figure 6:
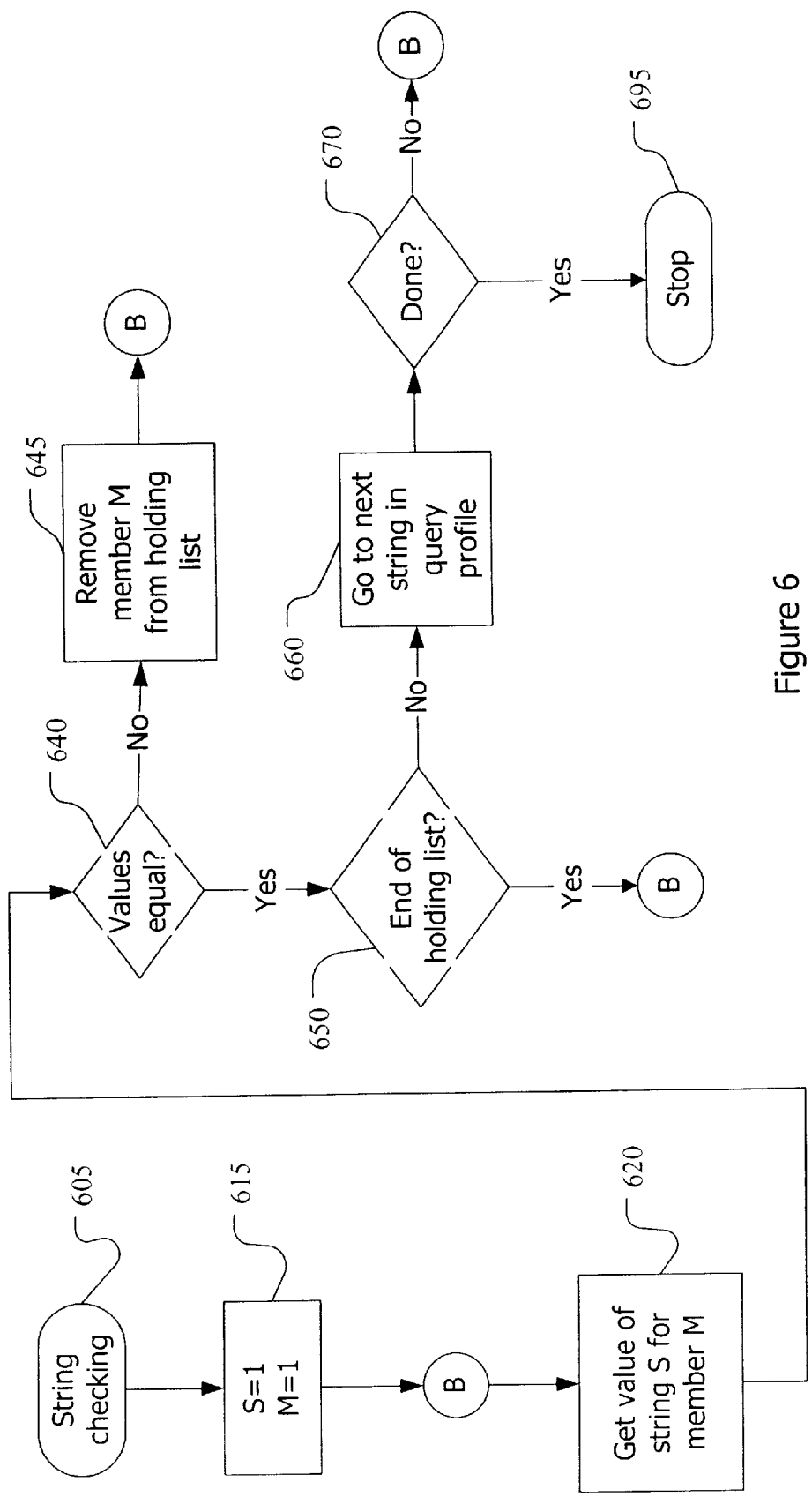
FIG. 6 is a flow chart of a string checking step of the method of querying a database.

Referring now to FIG. 6, there is shown a flow chart of a string checking step (step 360). With entry into this procedure (step 605), cyclical processing in a manner similar to binary matching and range checking is performed.

Assuming there are n strings in the query profile to be processed, the strings will be processed from 1 to n. Thus, the next step is to set the string number S to 1 (step 615). In this step, processing of the holding list is set to the beginning, for example by setting the record number R to 1.

Now, the comparison of string S of the query profile is made against string S of each of the records in the holding list. This is done by first getting the string S for record R in the holding list (step 620). Next, string S of record R is compared against string S of the query profile (step 640). If the string S of record R matches string S of the query profile, then it is tested whether record R is the last in the holding list (step 650). If record R is not the last in the holding list, then processing should continue with the next record in the holding list (e.g., by incrementing M) (step 620).

Returning to step 640, if string S of record R does not match string S of the query profile, then record R is removed from the holding list (step 645). Processing then continues with the next record in the holding list (step 620).

Returning to step 650, if the end of the holding list has been reached, then the next string of the query profile is set for testing (e.g., S is incremented) (step 560). If there are no more strings to process (step 570), then processing of string attributes is complete (step 695). Otherwise, processing continues with the first record in the holding list (e.g., R is set to 1) (step 620).

As can be seen, a database query in accordance with the invention can be very efficient. Further efficiency can be obtained by implementing key steps, such as the chunk matching step, in assembly language. It can be seen that such steps are assembly language friendly, so they are easily reduced to short assembly language code. Furthermore, the method is highly conducive to multi-threading and parallel processing. This efficiency comes at the cost of an extra step during data entry/storage of encoding data.

Additionally, known compression and space-reduction techniques may be applied to the records and databases (and other structures). For example, values may be represented using dictionary-type methods, including methods that match bit patterns that are less than the entire length of a value. An effect of this compression and the compression techniques above is to produce more random bit patterns, which in turn improves hashing performance. In addition, the correlation table 160, databases 140, 141, 142, 143, 150, 151, 152 and other structures may be compressed, for example, using methods that take advantage of repeated bit patterns, such as run-length encoding, and word compaction (i.e., packing values into physical data storage units when there is a mismatch between the value size and the physical storage unit).

A database in accordance with the invention therefore provides a number of benefits. First, it provides for reduced cost. An ad server that has low overhead and fast execution greatly reduces the amount of hardware and time to serve ads. Second, it provides content flexibility. There is considerable benefit to having a system which can target content, instead of just advertising. Content may include advertising for a regular banner ad, URL/keyword selection, customization of the user interface for a client application, customization of a start page for Internet access, or web page content customization. All of these items may be targeted in the same manner or in different manners. Third, it provides enhanced targeting through expanded and more flexible attribute selection. Fourth, it provides maximum efficiency. Given the cost of typical ad serving solutions in time, hardware and maintenance, the system provides the maximum effect with the least cost. This includes minimizing the use of RAM and other relatively expensive components (as opposed to disk space.) This also includes minimizing the impact on other server and client systems to reduce the requirements to support those systems.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterartions should therefore be seen as within the scope of the present invention.

It is claimed:

1. A method of querying a database, the method comprising the steps of:

providing binary attributes having respectively associated therewith predefined lists of allowable values and corresponding bitmasks providing the database, the database comprising plural records, at least some of the records comprising profiles, the profiles comprising at least one target comprising one binary attribute having a bitmask, at least some of the records comprising profiles comprising a range attribute having a numeric value forming a query comprising a query profile, the query profile including
   a first target comprising a first bitmask corresponding to a first binary attribute and a first value
   a second target comprising a range attribute and a range of numeric values performing bitwise logical operations of the first bitmask with the record profiles to thereby identify records in the database having the first target ("first records")

after the step of performing bitwise logical operations, testing the range attributes of each of the first records to thereby identify second records in the database having the range attribute within the range of numeric values of the third target ("second records").

2. The method of querying a database as set forth in claim 1 the query profile further including a third target comprising a second bitmask corresponding to a second desired attribute and a second value the first bitmask and the second bitmask being joined into a single bitmask to thereby form a chunk the step of performing bitwise logical operations comprising performing bitwise logical operations of the chunk with the record profiles to thereby identify records in the database having the first target and the third target.

3. The method of querying a database as set forth in claim 1 the query profile further including a third target comprising a second bitmask corresponding to a second desired attribute and a second value the first bitmask comprising a first chunk and the second bitmask comprising a second chunk the step of performing bitwise logical operations comprising performing bitwise logical operations of the first chunk with the record profiles to thereby identify records in the database having the first target ("second records") and then performing bitwise logical operations of the second chunk with the profiles of each of the second records to thereby identify first records having the second target.

4. The method of querying a database as set forth in claim 1 at least some of the records comprising profiles comprising a string attribute having a non-numeric value the forming step further comprising forming the query from a fourth target comprising a string attribute and a non-numeric value after the step of performing bitwise logical operations, testing the string attributes of each of the second records to thereby identify third records in the database having the string attribute corresponding to the non-numeric value of the fourth target.

5. A method of querying a database using binary attributes, the binary attributes having respectively associated therewith predefined lists of allowable values and corresponding bitmasks, the database comprising plural records, at least some of the records comprising profiles, the profiles comprising a first target comprising one binary attribute having a bitmask and a second target comprising a range attribute and a range of numeric values, the method comprising the steps of forming a query comprising a query profile, the query profile including a first target comprising a first bitmask corresponding to a first binary attribute and a first value a second target comprising a range attribute and a range of numeric values performing bitwise logical operations of the first bitmask with the record profiles to thereby identify records in the database having the first target after the step of performing bitwise logical operations, testing the range attributes of each of the second records to thereby identify second records in the database having the range attribute within the range of numeric values of the third target.

6. A method of storing data in a database, the method comprising the steps of:

providing a correlation table for plural binary attributes, the binary attributes having respectively associated therewith predefined lists of allowable values and corresponding bitmasks, receiving a first field of raw data receiving a second field of raw data looking up the first field in the correlation table and retrieving the bitmask for the binary attribute corresponding to the first field looking up the second field in the correlation table and retrieving the bitmask for the binary attribute corresponding to the second field storing a profile in the database, the profile comprising a first target, the first target comprising the retrieved bitmask for the binary attribute corresponding to the first field having the corresponding bit set corresponding to the raw data for the first field as provided in the correlation table a second target, the second target comprising the retrieved bitmask for the binary attribute corresponding to the second field having the corresponding bit set corresponding to the raw data for the second field as provided in the correlation table wherein the first target and the second target are formed and stored in a chunk of plural bits, the first target and the second target each having predefined positions in the chunk, the chunk having a length, wherein the length renders the chunk at least one of easily stored in memory, retrievable from memory or manipulated by a processor.

7. The method of storing data in a database as set forth in claim 6, wherein the assigned bit is set as "1".

8. The method of storing data in a database as set forth in claim 6, wherein the assigned bit is set as "0".

9. The method of storing data in a database as set forth in claim 6, the bitmasks each have a length equal to the number of allowable values for the corresponding binary attribute.

10. The method of storing data in a database as set forth in claim 6, the binary profile comprising plural chunks of plural targets.

11. The method of storing data in a database as set forth in claim 6 further comprising receiving a second field of raw data, the second field comprising a numeric value storing a range attribute in the database, the range attribute comprising the numeric value.

12. The method of storing data in a database as set forth in claim 6 further comprising receiving a second field of raw data, the second field comprising a non-numeric value storing a string attribute in the database, the string attribute comprising the non-numeric value.

13. A database system comprising a correlation table of binary attributes having respectively associated therewith predefined lists of allowable values and corresponding bitmasks a user database comprising plural records, at least some of the records comprising profiles, the profiles comprising a first target comprising one binary attribute having a bitmask a second target comprising a range attribute and a range of numeric values a content database comprising plural records, at least some of the records comprising profiles, the profiles comprising a first target comprising one binary attribute having a bitmask a second target comprising a range attribute and a range of numeric values computer software code for matching records of the content database with a selected record of the user database, the selected record having a first target, the computer software code including code for performing bitwise logical operations of the bitmask of the selected record of the user database with the profiles of the records of the content database to thereby identify records of the content database having the first target ("first records")

after performing bitwise logical operations, testing the range attributes of each of the first records to thereby identify second records in the database having the range attribute within the range of numeric values of the second target.

14. A method of querying a database, the method comprising the steps of:

providing binary attributes having respectively associated therewith predefined lists of allowable values and corresponding bitmasks providing the database, the database comprising plural records, at least some of the records comprising profiles, the profiles comprising a first target comprising one binary attribute having a first bitmask and a second target comprising one binary attribute having a second bitmask, the records including at least one chunk comprising binary attributes of a single bitmap, the chunk having a length, wherein the length readers the chunk at least one of easily stored in memory, retrieved from memory or manipulated by a processor forming a query comprising a query profile, the query profile including a chunk formed from a third target comprising a third bitmask corresponding to a first binary attribute and a first value a fourth target comprising a fourth bitmask corresponding to a second binary attribute and a second value performing bitwise logical operations of the query chunk with the chunks of the record profiles to thereby identify records in the database having the third target and the fourth target.

15. The method of querying a database as set forth in claim 14 at least some of the records comprising profiles comprising a range attribute having a numeric value the forming step further comprising forming the query from a third target comprising a range attribute and a range of numeric values after the step of performing bitwise logical operations, testing the range attributes of each of the second records to thereby identify second records in the database having the range attribute within the range of numeric values of the third target.

16. The method of querying a database as set for in claim 15 at least some of the records comprising profiles comprising a string attribute having a non-numeric value the forming step further comprising forming the query from a fourth target comprising a string attribute and a non-numeric value after the step of performing bitwise logical operations, testing the string attributes of each of the third records to thereby identify third records in the database having the string attribute corresponding to the non-numeric value of the fourth target.

17. A database system comprising a correlation table of binary attributes having respectively associated therewith predefined lists of allowable values and corresponding bitmasks a user database comprising plural records, at least some of the records comprising profiles, the profiles comprising a first chunk including a first target comprising one binary attribute having a first bitmask a second target comprising one binary attribute having a second bitmask a content database comprising plural records, at least some of the records comprising profiles, the profiles comprising a second chunk including a third target comprising one binary attribute having a third bitmask a fourth target comprising one binary attribute having a fourth bitmask computer software code for matching records of the content database with a selected record of the user database, the selected record having a fifth target, the computer software code including code for performing bitwise logical operations of the bitmask of the selected record of the user database with the profiles of the records of the content database to thereby identify records of the content database having the fifth target wherein the first chunk and the second chunk comprises plural bits having a respective length, wherein the length renders the chunk at least one of easily stored in memory, retrieved from memory, or manipulated by a processor.

* * * * *

UNITED STATES PATENT AND TRADEMARK OFFICE
CERTIFICATE OF CORRECTION

PATENT NO. : 6,804,664 B1
DATED : October 12, 2004
INVENTOR(S) : Hartman et al.

It is certified that error appears in the above-identified patent and that said Letters Patent is hereby corrected as shown below:

Column 2,
Line 50, replace "groups of bit responding to the answers" with -- groups of bit maps corresponding to the answers --.

Column 3,
Line 12, replace "which are computionally intensive" with -- which are computationally intensive --.

Column 12,
Line 39, replace "atlerartions" with -- alterations --.

Column 15,
Line 32, replace "length readers" with -- length renders --.

Column 16,
Line 6, replace "as set for" with -- as set forth --.

Signed and Sealed this

Twenty-sixth Day of July, 2005

JON W. DUDAS
*Director of the United States Patent and Trademark Office*